Figure 1:
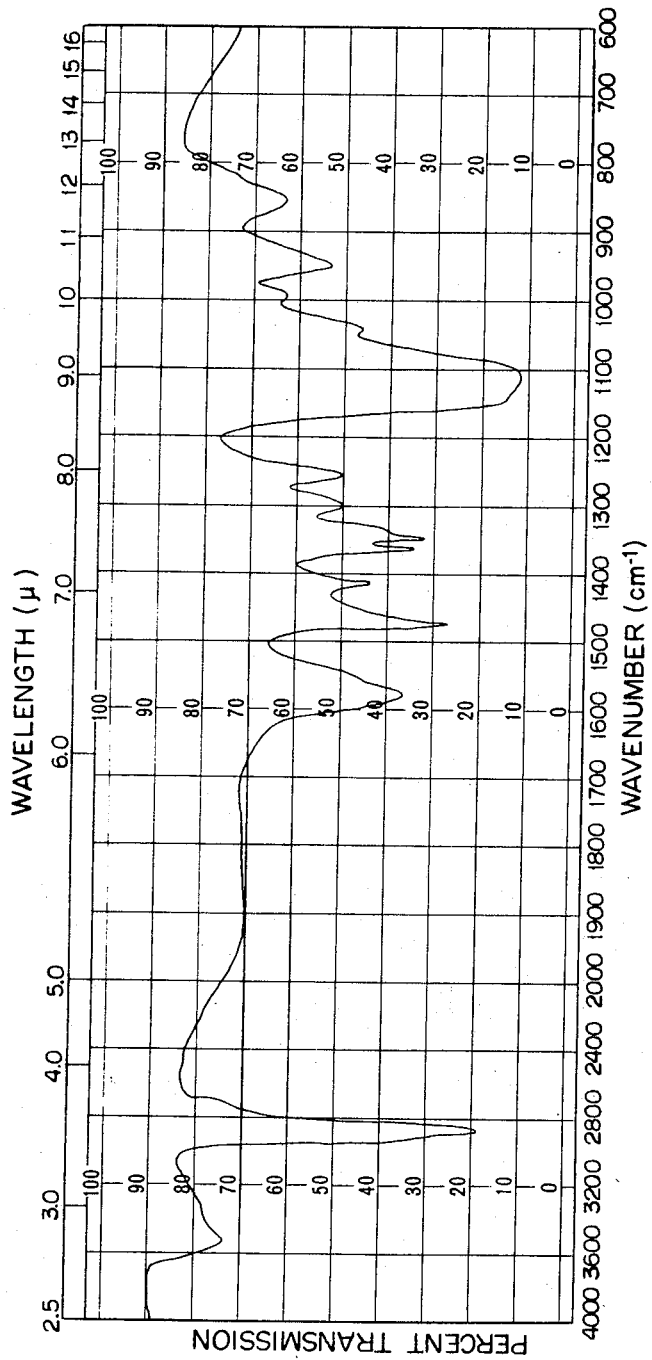

United States Patent
et al.

[15] 3,705,877
[45] Dec. 12, 1972

[54] ANTISTATIC SYNTHETIC RESIN COMPOSITIONS CONTAINING TRAZINE DERIVATIVES

[72] Inventors: Tatsuo Ishikawa, Shiro Hiruta, Teruomi Wababayashi, Yoshihiko Inamoto, Tetsuhiro Kusunose, Tatsuichi Tsumaki, Masami Ota, all of Nobeokashi, Japan

[73] Assignee: Asahi Kasei Kogyo Kabushiki, Asaka, Japan

[22] Filed: June 8, 1970

[21] Appl. No.: 44,283

Related U.S. Application Data

[62] Division of Ser. No. 755,875, Aug. 28, 1968.

[30] Foreign Application Priority Data

Aug. 30, 1967 Japan .....................42/55188
Aug. 30, 1967 Japan .....................42/55189

[52] U.S. Cl. .........260/75 N, 117/138.8 R, 260/78 A, 260/78 L, 260/80.7, 260/89.5 S, 260/92.8 A, 260/93.5 A, 260/93.7, 260/94.9 GD, 260/248 CS, 260/DIG. 16, 260/DIG.19

[51] Int. Cl. .............................................C08g 17/14

[58] Field of Search ......260/DIG. 16, DIG. 19, 78 R, 260/78 L, 78 S, 248 CS, 75 N, 94.9 GD, 93.5 A, 92.8 A

[56] References Cited

UNITED STATES PATENTS 3,055,898   9/1962   Muller et al. ............260/249.8
3,206,328   9/1965   Shaw et al............117/138.8 A
3,448,085   6/1969   Pietvosza et al..........260/78 L Primary Examiner—Harold D. Anderson
Attorney—Burgess, Dinklage & Sprung

[57] ABSTRACT

Antistatic compositions comprising polymer materials, such as polyamides, polyesters, polyolefins, polystyrenes, polyvinyl chloride, polyvinylidene chloride, polymethylmethacrylate or polyacrylonitrile butadiene styrene terpolymer and triazine derivatives as an antistatic agent.

7 Claims, 8 Drawing Figures

FIG. I

TATSUO ISHIKAWA
SHIRO HIRUTA
TERUOMI WAKABAYASHI
YOSHIHIKO INAMOTO
TETSUHIRO KUSUNOSE
TATSUICHI TSUMAKI
MASAMI OTA
INVENTORS

BY
Burgess, Dinklage & Sprung
ATTORNEYS.

TATSUO ISHIKAWA
SHIRO HIRUTA
TERUOMI WAKABAYASHI
YOSHIHIKO INAMOTO
TETSUHIRO KUSUNOSE
TATSUICHI TSUMAKI
MASAMI OTA
INVENTORS

TATSUO ISHIKAWA
SHIRO HIRUTA
TERUOMI WAKABAYASHI
YOSHIHIKO INAMOTO
TETSUHIRO KUSUNOSE
TATSUICHI TSUMAKI
MASAMI OTA
    INVENTORS

ANTISTATIC SYNTHETIC RESIN COMPOSITIONS CONTAINING TRAZINE DERIVATIVES

This application is a division of application Ser. No. 755,875 filed Aug. 28, 1968.

This invention relates to antistatic compositions containing novel triazine compounds which are characterized by their improved staticity.

The novel compounds of the present invention are triazine derivatives represented by any one of the following formulae:

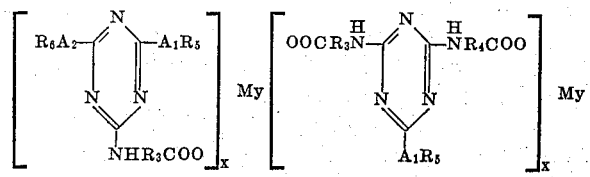

and

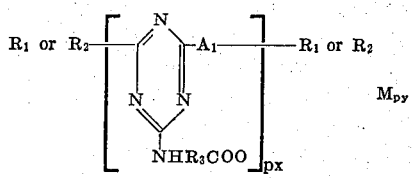

where $A_1$ and $A_2$ are same or different and each denotes a polyalkylene oxide selected from the group consisting of polyethylene oxide $\left(OCH_2CH_2\right)_n$, polypropylene oxide $$\left(OCHCH_2 \atop CH_3\right)_n$$

and polyethylene oxide-polypropylene oxide copolymer $$\left(OCH_2CH_2\right)_m \left(OCHCH_2 \atop CH_3\right)_n$$

wherein $n$ is an integer of 1 to 200 and $m+n$ is an integer of 2 to 200, ($m$ and $n \geqq 1$); $R_1$ and $R_2$ are the same or different and are each one to four carbon alkoxy $R_3$ and $R_4$ are same or different and each denotes a member selected from the group consisting of alkylene of one to 12 carbon atoms, o- and p-cyclohexylene, o- and p-methylene cyclohexylene, o- and p-phenylene, and o- and p-methylene phenylene; M denotes a member selected from the group consisting of hydrogen, a metal selected from the group consisting of calcium, barium, magnesium, tin, aluminum, copper, potassium, sodium, zinc, manganese, nickel, strontium and cadmium, and organic amine selected from the group consisting of mono-, di- and tri-ethanol amines, primary, secondary and tertiary amines of one to 17 carbons atoms; in each substituent; $x$ and $y$ each denotes an integer of 1 to 4 depending on the valency of the metal; $p$ is an integer of 2 to 5 ; and $R_5$ and $R_6$ are same or different and each denotes a member selected from the group consisting of hydroxy, alkoxy of one to 10 carbon atoms, naphthoxy, benzoxy, secondary amino of one to 17 carton atoms, in each substituent and

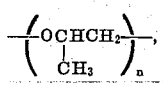

where $R_7$ denotes a member selected from the group consisting of alkyl of one to 17 carbon atoms, phenyl, p-carboxy phenyl

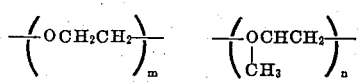

and naphthyl.

The novel compound as identified above can be advantageously used as antistatic agents for synthetic polymers such as polyamides, polyesters, polyolefins, polystyrene and polyvinyl chloride, said antistatic effect being imparted by incorporating the triazine derivative in a conventional manners with such synthetic polymers as are mentioned above. Single compound or the mixtures of two or more triazine compounds are used.

Generally, the buildup of high electrostatic charges on the synthetic polymer materials, formed by contact and friction thereof with other materials, causes various troubles in the fabricating operations and in the use, such as attracting dust and sparking, etc.

Especially, this is remarkable in the atmosphere of low humidity, i.e. lower than 50 percent of relative humidity (abbreviated as RH hereafter). For example, contact of polyamide fibers with other materials creates high electrostatic charges on the fibers, which causes repelling motion between individual filaments and fluff in textile processing and unpleasant shocks to human bodies.

These undesirable phenomena are considered to be due to the staticity of the synthetic polymer materials.

In order to suppress the staticity of the synthetic polymer materials or to substantially eliminate the staticity, various antistatic agents have been heretofore proposed.

For example, it is well-known to apply them on the surfaces of the materials, as described in American Dyestuff Reporter, 41, 368 (1954) or to melt-mix them into the material, as described in British Pat. No. 907,016 and in British Pat. No. 963,320.

Most of the existing antistatic agents, however, have proved to be deficient in practical use in that the antistatic effect soon decays and that the presence of the antistatic agents with the synthetic polymer material tends to cause the breaking of threads and fluff during the spinning and drawing operations, and the yellowing of articles as molded due to the insufficient feedability of the polymer material into the screw-type extruder, which results in the lowering of the operational efficiency and the degradation of the products.

An object of the present invention is to provide antistatic polymer compositions which exhibit permanent antistaticity even in an atmosphere of a low humidity, and which are free from the deficiencies during the manufacturing processes.

Based on the various properties of the triazine derivatives, particularly, a desirable affinity to and compatibility with the various synthetic polymer materials as well as antistaticity, the deficiencies which have been encountered in the use of conventional antistatic agents in admixture with the synthetic polymer materials, can be substantially removed.

For example, the loss of operational efficiency and degradation of the products, such as lowering of spinning efficiency due to end breakage and fluff, lowering of molding efficiency and the yellowing of the product, which have ordinarily formed a source of troubles when the conventional antistatic agents were melt-mixed with polymer materials, can be completely removed.

Further, it is remarkable that the antistatic effect once imparted to the composition does not decay for a longer period of time in whatever manner the triazine derivatives are added to the polymer material.

derivatives have excellent affinity to and compatibility with the synthetic polymer materials and remain stable up to about 300° C, and up to 150° C even on heating treatment in the presence of oxygen.

They are effective through the conventional applying procedures, such as melt-mixing, coating and dipping.

The whole scheme for producing the novel triazine derivative is illustrated in the following equations:

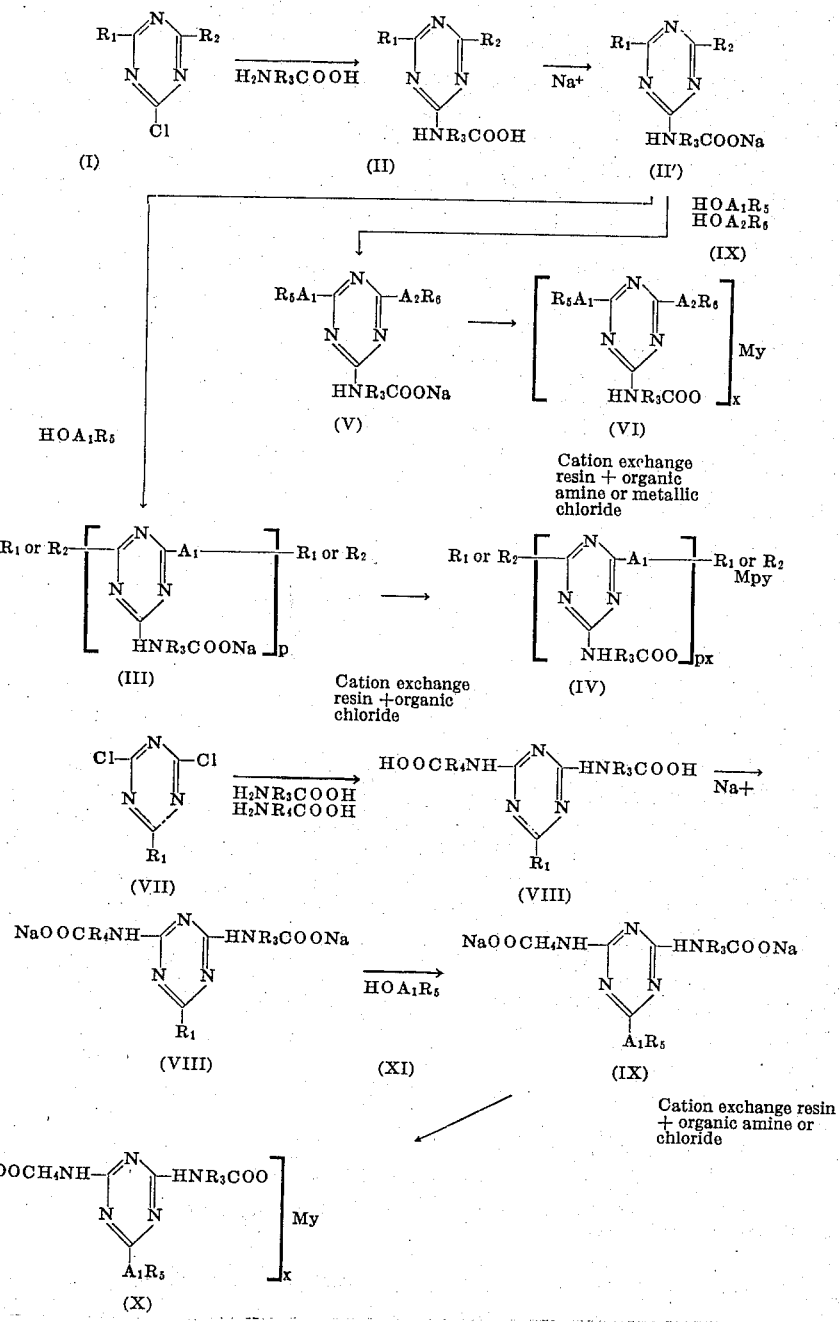

Further, the compositions remain antistatic even where they are subjected to laundry procedures under severe conditions.

Novel triazine derivatives which work as an antistatic agent when they are admixed with or incorporated into synthetic polymer material, impart the characteristic antistaticity to the product, which continues for a longer period of time. Further, the novel triazine where $R_1$ and $R_2$ are same or different and each denotes an alkoxy group of one to four carbon atoms, $R_3$, $R_4$, $R_5$ and $R_6$ are defined before; and M, p, x and y are as defined before. Although there is no reference to the potassium salt in the above formulae for simplification, the potassium salt is included in the same manner as above.

Referring to the above formulae, the typical method of preparing triazine derivatives is now explained in detail.

Di-(or mono-) alkoxy-mono-(or di-respectively)-chloro-syntriazine (I) or (VII) respectively is reacted with an ω-amino acid in a homogeneous phase in an appropriate solvent such as water, methanol, ethanol, propanol, butanol, or mixtures of at least two of them. The presence of an alkaline condensating agent such as sodium bicarbonate, sodium hydroxide, sodium carbonate, potassium bicarbonate, potassium carbonate, or potassium hydroxide in the reaction system is effective in promoting the reaction. Thus obtained is, the sodium or potassium salt (II)' or (VIII)' of di-(or mono-)alkoxy-mono-(or di-respectively) ω-aminoacid-syn-triazine (II) or (VIII) respectively, which is then reacted with one or more polyalkylene glycols or the derivatives thereof to form compound (III), (V) or (IX) by alcohol interchange reaction. The use of one mole of glycol or glycol derivative $H_6A_1R_5$ leads to the formation of compounds (III) and (IX) and the use of two moles thereof leads to the formation of compound (V). In order to obtain the metal salts of compound (III), (V) ot (IX) other than sodium salt and potassium salt, compound (III), (V) or (IX) is reacted with chloride to complete metathesis, giving finally compound (IV), (VI) or (X) respectively. Alternatively, in order to obtain amine salts of compounds (III), (V) or (IX), the compound (III), (V) or (IX) is treated with cation exchange resin, followed by the neutralization treatment with organic amines, to give finally compounds (IV), (VI) or (X) respectively. When, M is hydrogen, the amination process or metathesis eliminated. Di-(or mono-)alkoxy-mono-(or di-)chloro-syn-triazine (I) or (VII) is generally prepared by the reaction between cyanuric chloride and a lower alcohol such as methanol, ethanol, propanol, n-butanol, isobutanol, as reported by James R. Dudley in J. Am. Chem. Soc. 1951, 73 p. 2986.

On the metathesis reaction, although any metal ion may be used as cation so long as the addition of metal ions does not seriously cause undesirable yellowing of synthetic polymer material, those appropriate are calcium, barium, magnesium, tin, aluminum, copper, potassium, sodium, zinc manganese, strontium, cadmium and nickel.

$A_1$ and $A_2$ of the compounds (IV) and (VI), are same or different and each denotes polyalkylene oxide selected from the group consisting of polyethylene oxide $+OCH_2CH_2+_n$, polypropylene oxide

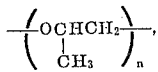

polyethylene oxide-polypropylene oxide copolymer

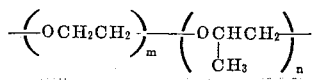

wherein $n$ is an integer of 1 to 200 and $m+n$ is an integer of 2 to 200, $(m, n \geq 1)$.

As said polyalkylene glycol derivatives, there may be mentioned compounds prepared by etherifying one of the hydroxy groups of the polyalkylene glycol with an alkyl group of one to 10 carbon atoms such as, methyl, ethyl, propyl, iso-octyl, or decyl, or with an aryl group such as nonylphenyl, dodecylphenyl, phenyl, or naphthyl, and compounds prepared by esterifying one of the hydroxy groups with an aliphatic carboxylic acid of one to 18 carbon atoms such as formic acid, acetic acid, stearic acid, lauric acid, propionic acid, caproic acid, or aryl carboxylic acid such as benzoic acid, naphthoic acid, or terephthalic acid, and compounds prepared by aminating one of the hydroxy groups of polyalkylene glycol with a secondary amine of one to 17 carbon atoms such as dimethylamine, diethylamine, dipropylamine, dioctylamine, dilaurylamine, distearylamine, methylethylamine, methylpropylamine, methyloctylamine, ethyllaurylamine, diphenylamine, or ethylphenyl amine.

The illustrative examples of organic amines used in the neutralization process include ethanolamines such as monoethanolamine, diethanolamine or triethanolamine, primary, secondary and tertiary amines of one to 17 carbon atoms per chain such as methylamine, ethylamine, propylamine, stearylamine, caprylamine, cyclohexylamine, dimethylamine, diethylamine, dipropylamine diisopropylamine, dicaprylamine, ethylstearylamine, ethylcyclohexylamine, trimethylamine, triethylamine, tripropylamine, triisopropylamine, methylethylamine, methylpropylamine, methyl-i-propylamine, stearylcaprylamine, methyllaurylamine, ethylpropylamine, ethyl-i-propylamine, ethyllaurylamine, methyloctylamine, diphenylamine, ethylphenylamine, dimethylethylamine, dimethylpropylamine, dimethyl-i-propylamine, dimethylstearylamine, methylethylpropylamine, methyldipropylamine, diethyllaurylamine, methylethylcyclohexylamine, diethylcaprilamine, dimethyllaurylamine, or ethylpropylstearylamine.

As said $R_3$ and $R_4$ there may be mentioned methylene, ethylene trimethylene, pentamethylene, hexamethylene, octamethylene, decamethylene, undecamethylene, o-cyclohexylene, p-cyclohexylene, o-methylene cyclohexylene p-methylene cyclohexylene, o-phenylene, p-phenylene, o-methylene phenylene, or p-methylene cyclohexyl, o-phenylene, p-phenylene, o-methylene phenyl, p-methylene phenyl.

According to the present invention, the polymer compositions free from staticity are obtained by adding at least one triazine derivative as specified above to any synthetic polymer materials. Although these compounds (IV), (VI) and (X) may be added to the polymer materials in interest at any time during the manufacturing process to impart permanent antistatic effect to them, the addition of the compounds to the polymer material in the polymerization process and in the molding process results in imparting to the polymer material more permanent antistatic effect.

The illustrative polymer materials to which the compounds of the present invention are added include homo- and co-polyamides, such as nylon 6, nylon 6.6, nylon 6.10, nylon 11, nylon 3, nylon 4, nylon 7, nylon 9, nylon 6, nylon 12, nylon 6/metaxylylenediamine, nylon 6/6.6, nylon 6/6.10, nylon 6/hexamethylene terephthalamide, 6-metaxylene adipamide, 6/6.6-hexymethylene terephthalamide, nylon 6/6.6/6.10, nylon 6/6.6/metaxylyleneadipamide; polyesters such as polyethylene terephthalate, polycyclohexylene dimethylene terephthalate, polyester from vanilic acid, polycarbonate, polyethylene isophthalate; polyolefines such as polyethylene, polypropylene; polystyrene;

polyvinyl chloride; polyvinylydene chloride; polymethylmethacrylate and polyacrylonitrilebutadiene styrene terpolymers.

The amount of the compounds to be added to the polymer material is determined at such value as not to cause undesirable effect on the spinnability and moldability of the polymer material. Therefore, amounts ranging from 0.1 – 20 percent by weight based on the polymer amount is employed with good spinnability, moldability and compatibility.

Amounts above about 20 percent by weight will result in poor spinnability, and poor moldability. The lower limit for the amount is determined by consideration of the effects to be desired.

The compounds of the present invention may be used in conjunction with other additives such as, plasticizers, color-stabilizers, thermal-stabilizers, U.V. absorbants, dyes, and/or pigments.

The compounds of the present invention are advantageously utilized as antistatic agent for the polymer material.

It is noted that the antistatic effect of the compositions of the present invention is markedly superior to that imparted by the conventional antistatic agents, as shown in the illustrative examples. Further, said effect has proved to last through washing.

Antistatic effect is represented by half-life period of the static charge voltage.

Measurement of the half-life period is made as follows.

10,000 V is applied to the sample for 3 minutes at 20°C in 40 ± 3 percent RH and then the applied voltage was cut, at which time the measurement of the statistic charge voltage of the sample is started and is kept until the statistic charge voltage is reduced to half as much as that at the beginning. This time duration is taken as half-life period.

The sample prepared from the composition comprising polymer material and at least one compound of the present invention as an antistatic agent exhibits the half-life period of less than 5 seconds, while the conventional polymer compositions exhibit half lines of more than 300 seconds.

The present invention will more fully illustrated in the following examples.

These examples are intended to be illustrative only and not to be considered as exclusive.

In the example, the important compounds are accompanied by the structural formula number for reference.

Example 1.

Polyethylene glycol (molecular weight 1,500) (300 g) was dried at 120°C in vacuo, to which was added and dissolved 8 mol percent of metallic sodium.

To this solution was added the sodium salt (29.0 g) of 2,4-dimethoxy-6-amino-caproic acid-syn-triazine. The resulting mixture was heated with stirring first for 2 hours at 90°C, the under a pressure of 20 mm Hg and then for 2 hours at 150°C under a pressure of 2 mm Hg.

The elution of methanol which was considered to be caused by the alcohol interchange reaction was observed.

After cooling there was obtained a light-yellow waxy material corresponding to the structural formula (V).

The aqueous solution of the light-yellow waxy material was then treated with cation exchange resins (Dowex 50 W-X8) and condensed, giving 270 g of material corresponding to the structural formula (VI).

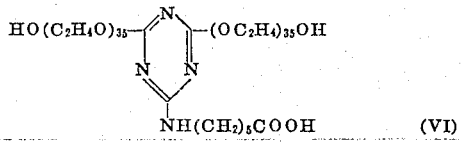

Figure 2:
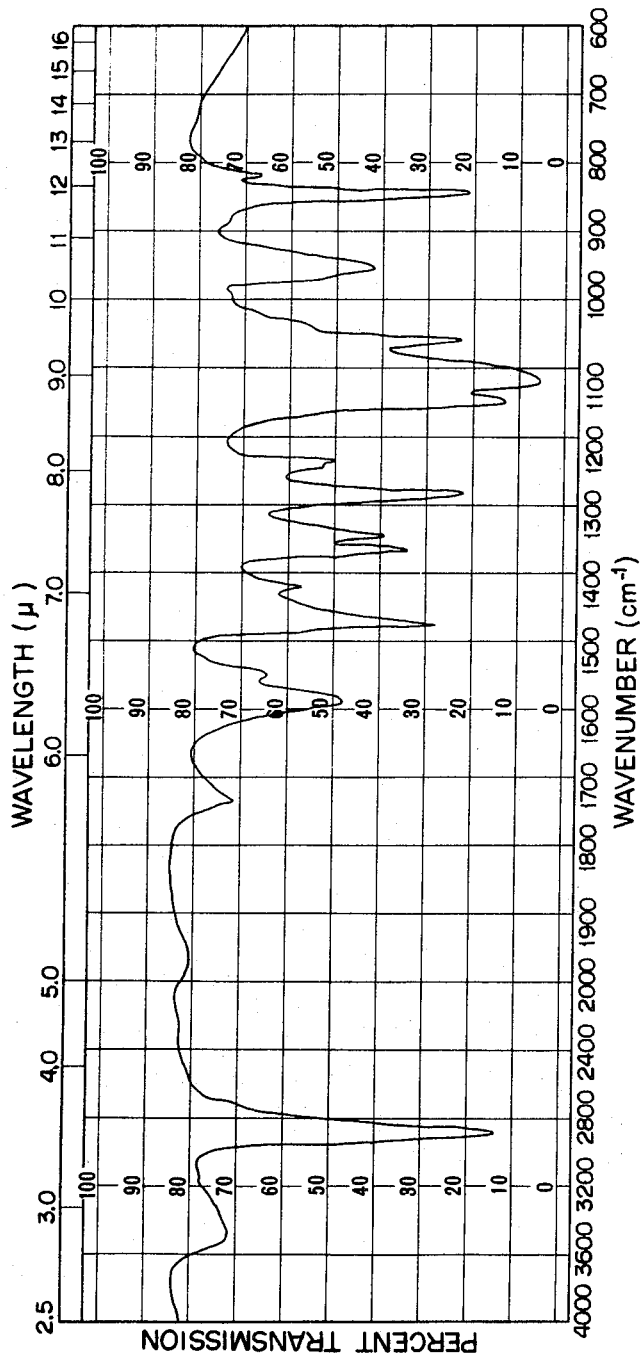

Infrared spectrum for compound (VI) is shown in FIG. 2.

Infrared spectrum for the material of structural formula (V) is shown in FIG. 1.

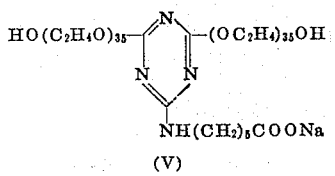

Example 2.

Figure 4:
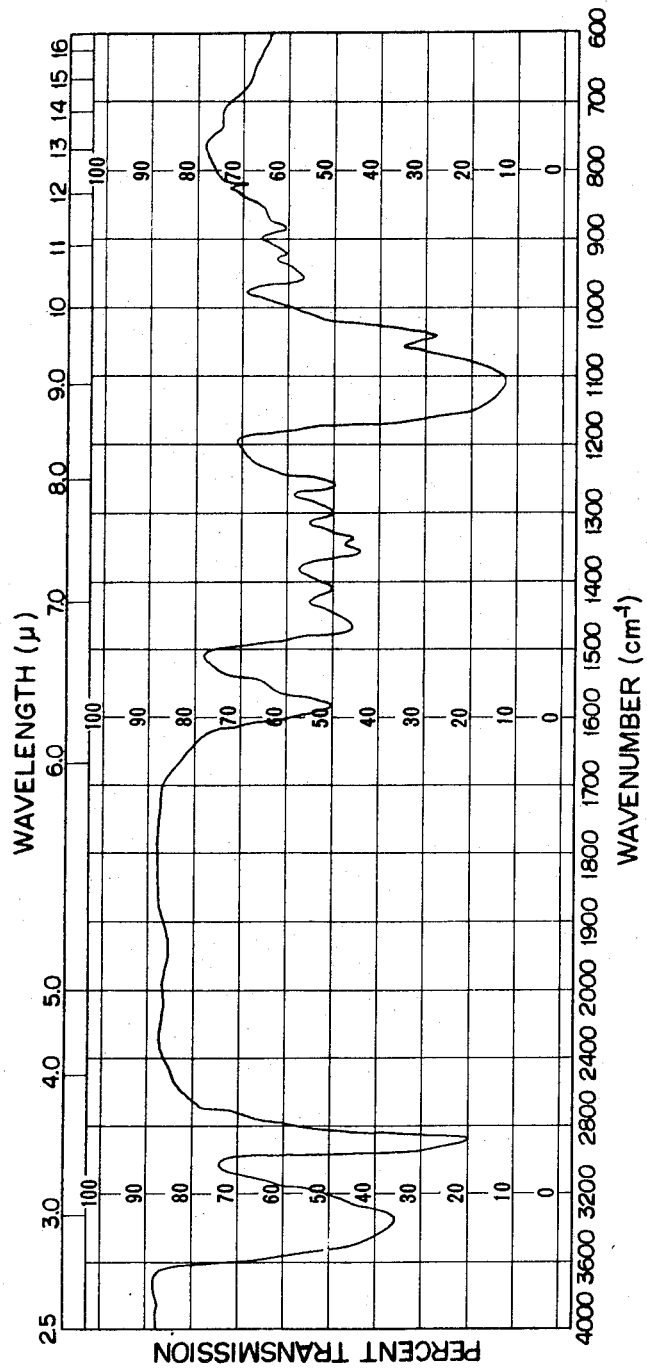

The white waxy material of structural formula (VI) (100 g) obtained in Example 1 was neutralized with diethanolamine (30 g), giving corresponding diethanol amine salt (91 g) in 90 percent yield, the infrared spectrum of which is represented in FIG. 4.

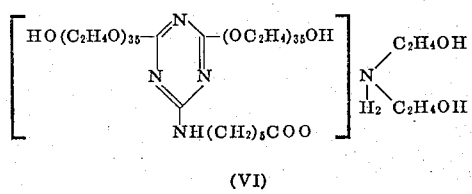

Example 3.

The light yellow waxy material of the structural formula (V) (100 g) obtained in Example 1 was methathesized with 20 percent aqueous solution of barium chloride (30 g). The resulting solution was condensed under a reduced pressure, by-produced sodium chloride removed by extraction with toluene.

Figure 3:
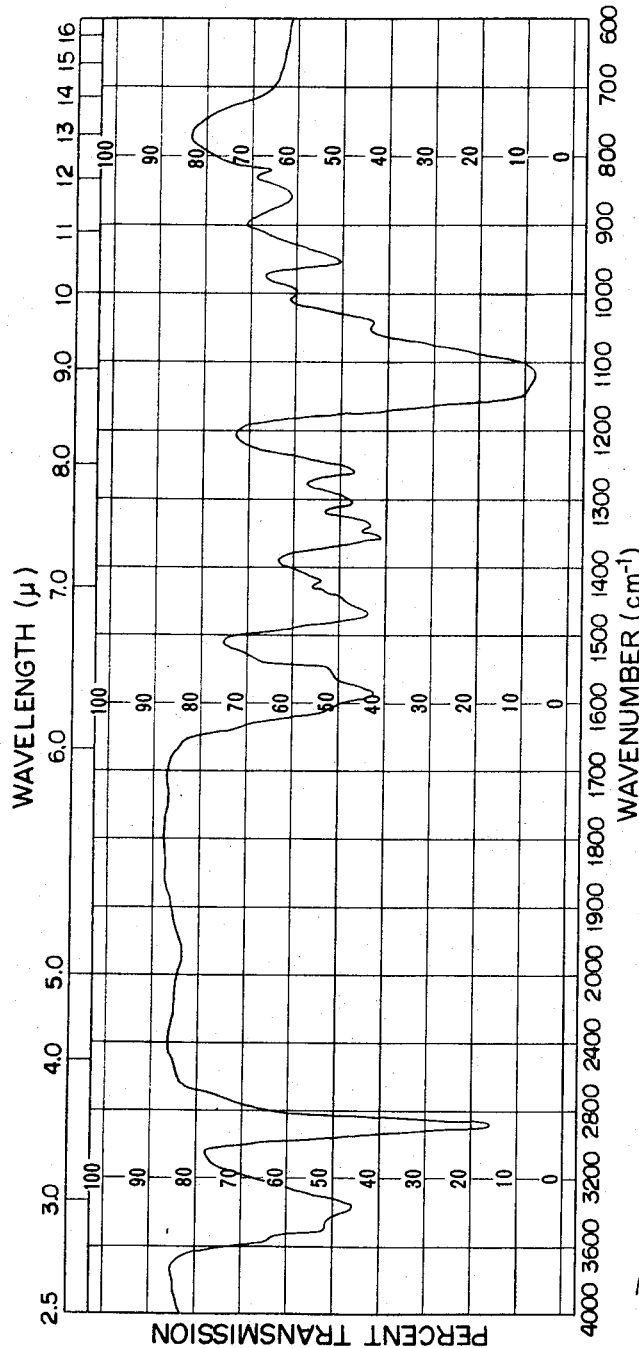

Infrared spectrum for the barium salt (VI) is given in FIG. 3.

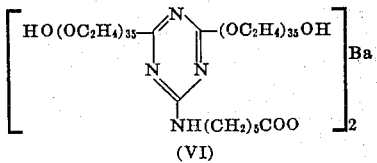

Example 4.

Figure 5:
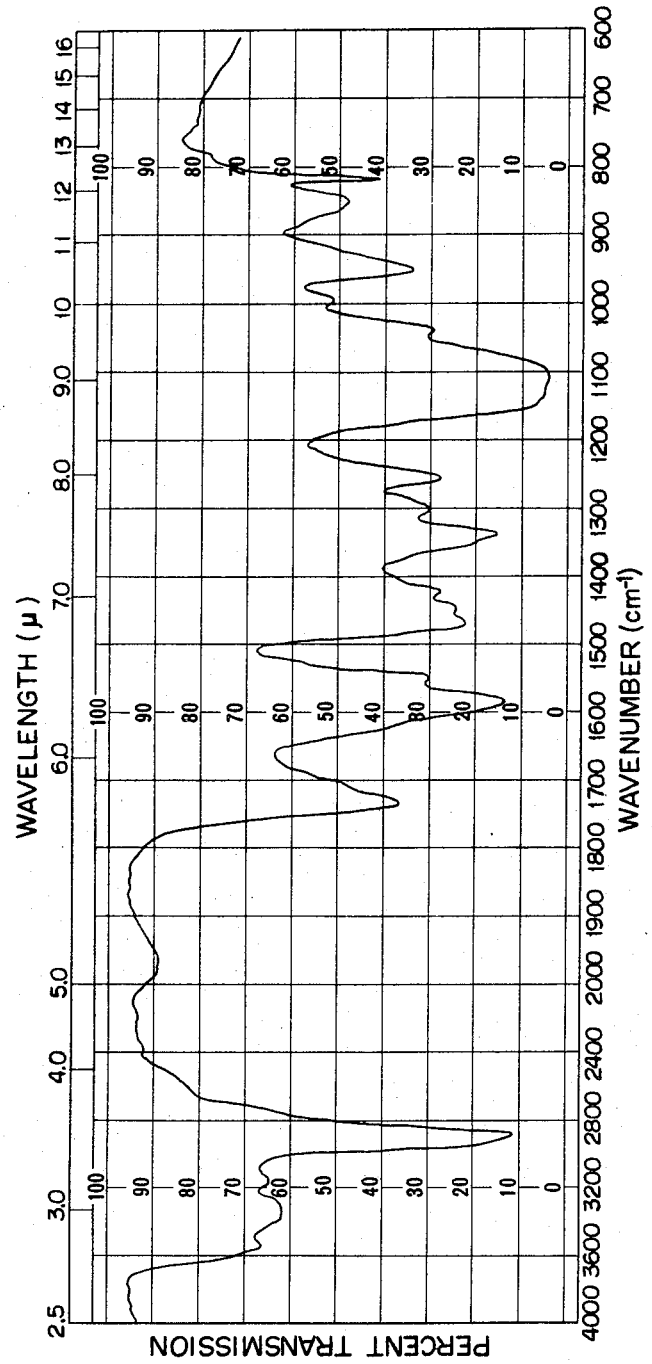

The sodium salt (VIII)' of 2-methoxy-4,6-diamino caproic acid-syn-triazine was reacted with polyethylene-glycol (molecular weight 1,000) in the same manner as described in the Example 1 and then treated with ion exchange resin, giving light brown waxy material (X). The infrared spectrum of the material (X) is given in FIG. 5.

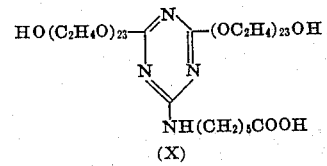

Example 5.

Figure 6:
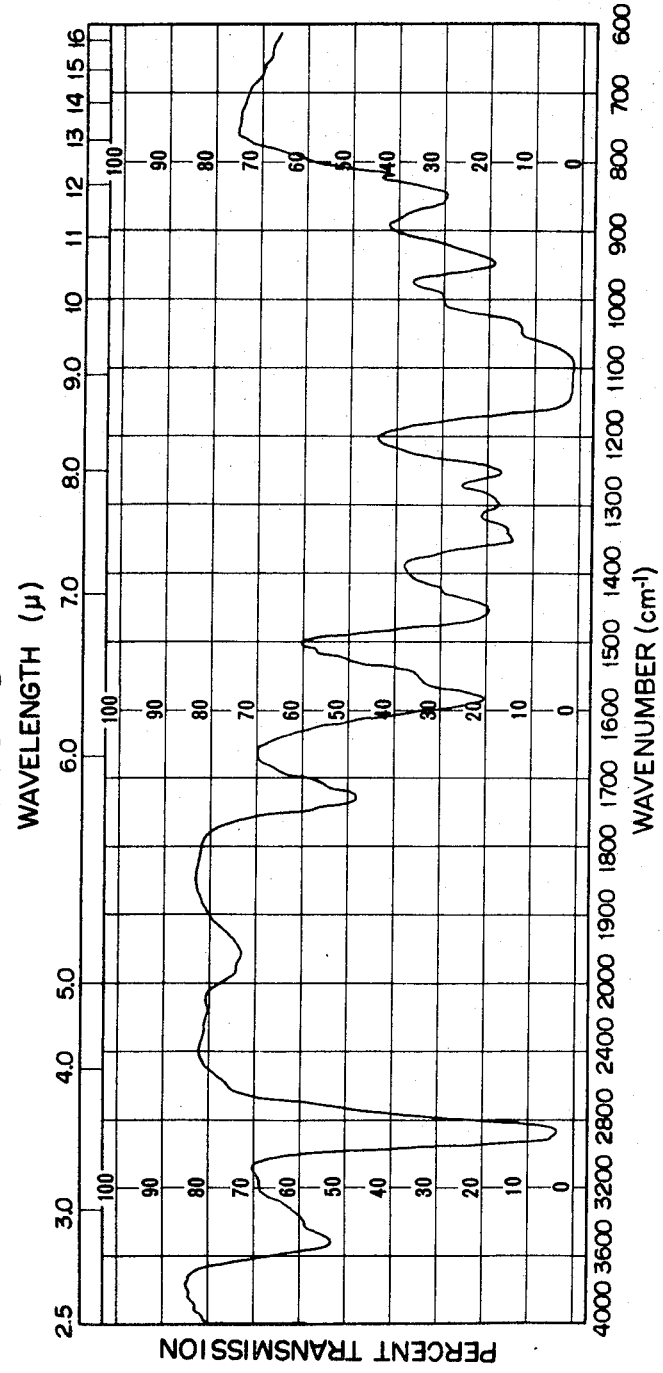
Figure 7:
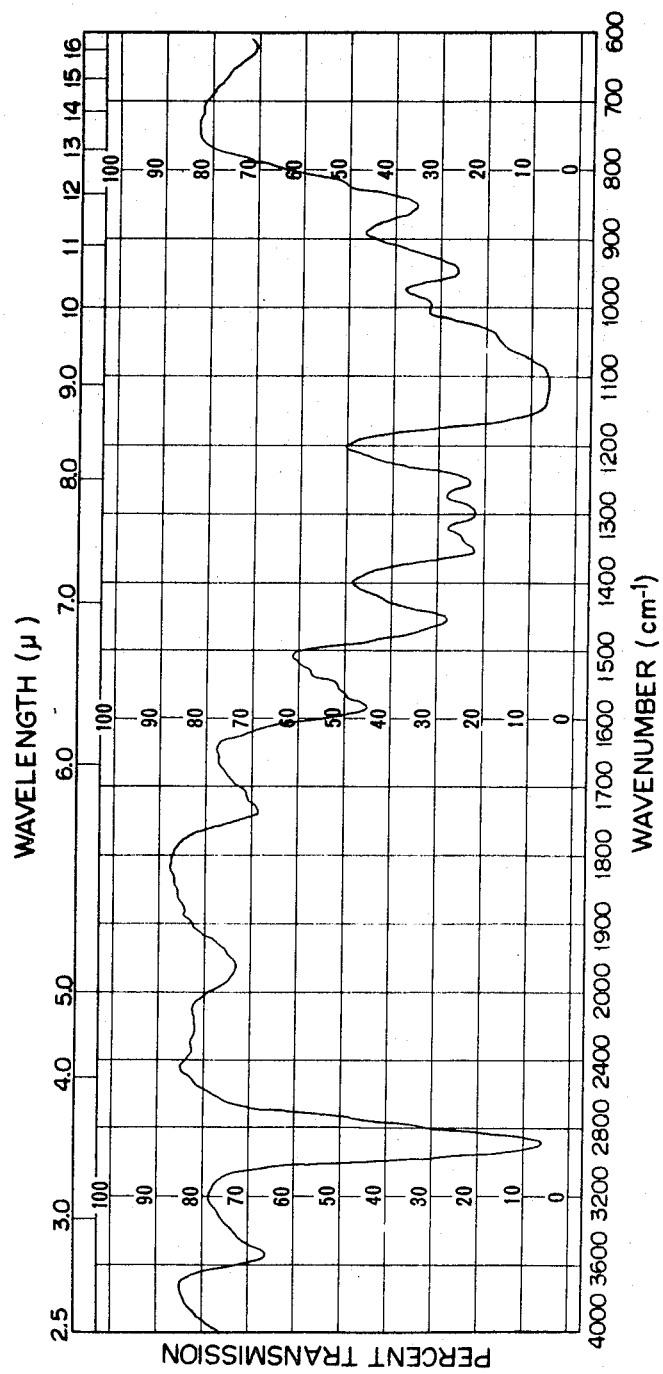
Figure 8:
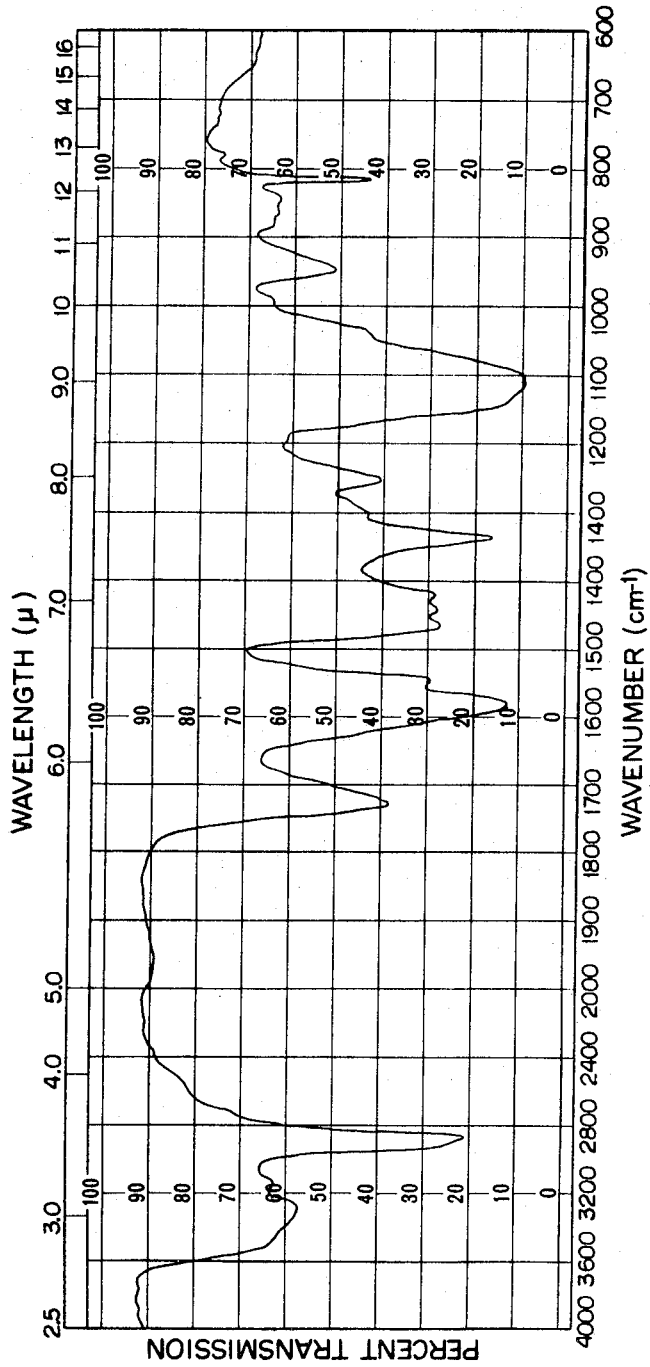

A variety of triazine derivatives were prepared in the same manner as described in Example 1 to 4 and illustrated in Table 1. Infrared spectra for compounds obtained in Run numbers 16, 3 and 13 are shown in FIGS. 6, 7 and 8 respectively.

TABLE 1

| Run No. | Structural formula (II)' or (VIII)' R₁ | R₂ | R₃ | R₄ | (XI) R₅ | R₆ | A₁ or A₂ | m+n or n | Mole ratio[1] | Yield[2] | ηsol.[3] | M.P. (°C.) | (IV) (VI) (X) M | X | Y | P |
|---|---|---|---|---|---|---|---|---|---|---|---|---|---|---|---|---|
| 1 | —OC₂H₅ | —OC₂H₅ | —(CH₂)— | | —OH | —OH | —(EG)ₙ— | 91 | 2 | 90 | 15.1 | 58–60 | H | 1 | 1 | 1 |
| 2 | —OC₂H₅ | —OC₂H₅ | —(CH₂)₃— | | —OH | —OH | —(EG)ₙ— | 91 | 2 | 89 | 14.8 | 59 | H | 1 | 1 | 1 |
| 3 | —OCH₃ | —OCH₃ | —(CH₂)₅— | | —OH | —OH | —(EG)ₙ— | 100 | 2 | 93 | 15.2 | 59–60 | H | 1 | 1 | 1 |
| 4 | —OCH₃ | —OCH₃ | —(CH₂)₁₁— | | —OH | —OH | —(EG)ₙ— | 100 | 2 | 88 | 15.0 | 58–61 | H | 1 | 1 | 1 |
| 5 | —OCH₃ | —OCH₃ |  | | —OH | —OH | —(EG)ₙ— | 100 | 2 | 90 | 14.7 | 60 | H | 1 | 1 | 1 |
| 6 | —OC₄H₉ | —OC₄H₉ | —CH₂— | | —OH | —OH | —(EG)ₙ— | 100 | 2 | 87 | 15.5 | 62 | H | 1 | 1 | 1 |
| 7 | —OCH₃ | —OCH₃ | | | —OH | —OH | —(EG)ₙ— | 200 | 2 | 86 | 21.2 | 81 | H | 1 | 1 | 1 |
| 8 | —OCH₃ | —OCH₃ | —(CH₂)₅— | | —OCH₃ | —OCH₃ | —(EG)ₙ— | 100 | 2 | 92 | 14.7 | 57–59 | H | 1 | 1 | 1 |
| 9 | —OCH₃ | —OCH₃ | —(CH₂)₅— | | | —OC₁₀H₂₁ | —(EG)ₙ— | 100 | 2 | 88 | 13.9 | 50 | H | 1 | 1 | 1 |
| 10 | —OCH₃ | —OCH₃ | —(CH₂)₅— | | | —OH | —(EG)ₙ— | 100 | 2 | 89 | 14.2 | 58–60 | H | 1 | 1 | 1 |
| 11 | —OCH₃ | —OCH₃ | —(CH₂)₅— | | —OCOCH₃ | —OCOCH₃ | —(EG)ₙ— | 100 | 2 | 93 | 13.4 | 91–43 | H | 1 | 1 | 1 |
| 12 | —OCH₃ | —OCH₃ | —(CH₂)₅— | | —OCO(CH₃) | —OCO—COOH | —(EG)ₙ— | 100 | 2 | 85 | 11.2 | 50–52 | H | 1 | 1 | 1 |
| 13 | —OCH₃ | —OCH₃ | —(CH₂)₅— | | —N(CH₃)(CH₃) | —N(CH₃)(CH₃) | —(EG)ₙ— | 10 | 2 | 92 | 5.10 | | | 1 | 1 | 1 |
| 14 | —OCH₃ | —OCH₃ | —(CH₂)₅— | | —N(Ph)(Ph) | —OCOC₃H₇ | —(EG)ₙ— | 8 | 2 | 90 | 4.9 | | H | 1 | 1 | 1 |
| 15 | —OCH₃ | —OCH₃ | —(CH₂)₅— | | —OH | —OH | —(EG)ₙ— | 10 | 2 | 96 | 6.5 | 60–63 | H | 1 | 1 | 1 |
| 16 | —OCH₃ | —OCH₃ | —(CH₂)₅— | | —OH | —OH | —(EG)ₙ— | 37 | 2 | 90 | 12.6 | 62–64 | Diethanol amine | 1 | 1 | 1 |
| 17 | —OCH₃ | —OCH₃ | —(CH₂)₅— | | —OH | —OH | —(EG)ₙ— | 37 | 2 | 91 | | 59–61 | Ca | 2 | 1 | 1 |
| 18 | —OCH₃ | —OCH₃ | —(CH₂)₅— | | —OH | —OH | —(EG)ₙ— | 37 | 2 | 90 | | | Ba | 2 | 1 | 1 |
| 19 | —OCH₃ | —OCH₃ | —(CH₂)₅— | | —OH | —OH | —(EG)ₙ— | 100 | 1 | 89 | 9.2 | | Al | 3 | 1 | 1 |
| 20 | —OCH₃ | | —(CH₂)₅— | | —OH | | —(EG)ₙ— | 35 | | 92 | | | Ba | 2 | 1 | 1 |
| 21 | —OCH₃ | | | —(CH₂)₅— | —OH | | —(EG)ₙ— | 87 | 1 | 90 | 9.2 | | Ca | 2 | 1 | 1 |

TABLE 1 —Continued
[1] Mole ratio corresponds to (II)' or (VIII)' (XI).
[2] Calcd. from eluted alcohol given by alcohol interchange reaction.
[3] Viscosity was measured for 25% aqueous solution at 25° C.
[4] $\left(\text{OCH}_2\text{CH}_2\right)_n$
[5] $\left(\begin{array}{c}\text{OCHCH}_2\\ \text{CH}_3\end{array}\right)_n$
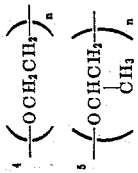

Example 6.

Six runs were made for each of the triazine derivatives prepared in Example 1 to 3 as follows.

In each run, triazine derivative was added in an amount as specified in Table 2 to the mixture of dried γ-caprolactam (10 kg) and water (0.3 percent by weight) as a polymerization catalyst charged in a 20 lit. autoclave. After the air was completely displaced from the autoclave with nitrogen and sealed, the mixture therein was brought into polymerization reaction at 260°C for 14 hours, producing white or light-yellow polymer, whose viscosity is listed in Table 2.

Polymer taken in the form of chips was extracted with boiling water for 20 hours, then dried under reduced pressure at 80°C for 48 hours and spun by a conventional melt spinning process at a spinning speed of 900 m/min.

Spun yarn was then stretched 4 times at a drawing speed of 300 m/min., wherein hot plate temperature was 120°C, to form a 210 denier - 24 filament yarn.

Said yarn was made into a bundle of 20 layers, rubbed with brush in an aqueous solution of 3 percent by weight neutral detergent at 50°C for 10 minutes and which have been subjected to 5 times, 10 times, 30 times and 50 times of washing are listed in Table 3 also, and it is apparent from these values that the antistatic effect of the samples exhibits sufficient washing resistance.

TABLE 3

| Run No. | Amount added (wt.%) | Washing Times 5 | 10 | 30 | 50 |
|---|---|---|---|---|---|
| 1 | 0 | ∞ | ∞ | ∞ | ∞ |
| 2 | 0.5 | 20 | 19 | 22 | 20 |
| 3 | 1.0 | 9 | 10 | 8 | 8 |
| 4 | 3.0 | 2 | 3 | 2 | 1 |
| 5 | 5.0 | <1 | <1 | <1 | <1 |

Example 7.

Five runs were made for each of the triazine derivatives prepared in Run Nos. 1, 16 and 27 of Example 5 as follows:

A 4 lit. autoclave equipped with a stirrer was charged with nylon 6.6 salt (15 kg) and water (0.6 kg), to which

TABLE 2

| | | Triazine derivative (VI) (in Example 1) | | | Di-ethanolamino salt of triazine derivative (VI) (in Example 2) | | | Barium salt (VI) of triazine derivative (in Example 3) | | |
|---|---|---|---|---|---|---|---|---|---|---|
| Run No. | Amount added (wt. percent) | Relative viscosity* | Tenacity (g./denier)/ elongation (percent) | Half-life period (sec.) | Relative viscosity* | Tenacity (g./denier)/ elongation (percent) | Half-life period (sec.) | Relative viscosity* | Tenacity (g./denier)/ elongation (percent) | Half-life period (sec.) |
| 1 | 0 | 2.94 | 6.8/28 | ∞ | 2.94 | 6.0/28 | ∞ | 2.94 | 6.0/28 | ∞ |
| 2 | 0.5 | 2.90 | 6.1/24 | 20 | 2.93 | 5.7/25 | 23 | 2.88 | 5.9/30 | 18 |
| 3 | 1.0 | 2.87 | 5.9/26 | 9 | 2.87 | 5.7/26 | 8 | 2.84 | 2.7/29 | 8 |
| 4 | 3.0 | 2.70 | 5.8/25 | 2 | 2.74 | 2.9/26 | 3 | 2.79 | 5.8/25 | 1 |
| 5 | 5.0 | 2.43 | 5.0/26 | <1 | 2.56 | 5.3/27 | <1 | 2.60 | 5.6/28 | <1 |
| 6 | 10.0 | 2.10 | 4.1/23 | <1 | 2.13 | 2.9/27 | <1 | 2.20 | 4.2/24 | <1 |

*Relative viscosity was measured at 25° C. for polymer solution in 95.5% sulfuric acid at a concentration of 1 g./100 ml.

washed with water for 20 minutes.

The washing procedure was repeated five times to provide a sample yarn.

Thus obtained sample yarn was conditioned in an atmosphere of relative humidity of 40 percent at 20°C for 15 hours. Then 10,000 V was charged to the sample yarn for 3 minutes and then cut off.

The parameter of the antistatic effect of the yarn is defined as a half-life period of voltage measured after the charge was cut off.

In Table 2 are tabulated half-life period for sample yarns. By referring to those values in the table, it will be recognized that the antistatic effect of each sample yarn is quite superior to that of the ordinary nylon 6 yarns including no antistatic agents.

The antistatic effect of each sample lasts long and is not diminished through washing.

The half-life period values measured for the samples triazine derivative was added at an amount listed in Table 4 below.

The air was displaced from the autoclave with nitrogen, and the temperature of the reaction mixture was maintained for 1 hour at 230°C under the pressure of 17.5 kg/cm² and then, for another 2 hours at 270°C under the same pressure to complete polymerization.

The pressure was reduced to normal pressure in 2 hours and the reaction mixture heated for 30 minutes. The resulting white polymer was taken out of the autoclave from the bottom thereof and was formed into chips. There was thus obtained white nylon 66 chips.

The chips were melt spun into a 210 denier - 24 filament yarn in the same manner as in Example 6.

The tenacity/elongation and antistatic effect of the yarn are listed in Table 4, showing superior yarn properties and antistatic effect.

TABLE 4

| | | Triazine derivative prepared in run No. 27 (in Example 5) | | | Triazine derivative prepared in run No. 16 (in Example 5) | | | Triazine derivative prepared in run No. 1 (in Example 5) | | |
|---|---|---|---|---|---|---|---|---|---|---|
| Run No. | Amount added (wt. percent) | Relative viscosity* | Tenacity (g./denier)/ elongation (percent) | Half-life period (sec.) | Relative viscosity* | Tenacity (g./denier)/ elongation (percent) | Half-life period (sec.) | Relative viscosity* | Tenacity (g./denier)/ elongation (percent) | Half-life period (sec.) |
| 1 | 0 | 2.81 | 6.2/25 | ∞ | 2.81 | 6.2/25 | ∞ | 2.81 | 6.2/25 | ∞ |
| 2 | 0.5 | 2.76 | 6.0/27 | 18 | 2.77 | 6.0/25 | 30 | 2.80 | 6.1/30 | 20 |
| 3 | 1.0 | 2.69 | 5.7/27 | 7 | 2.65 | 5.8/27 | 10 | 2.70 | 5.9/23 | 5 |
| 4 | 3.0 | 2.53 | 4.9/26 | 2 | 2.60 | 5.6/29 | 3 | 2.62 | 5.8/24 | 2 |
| 5 | 5.0 | 2.37 | 4.2/25 | <1 | 2.52 | 5.0/23 | <1 | 2.55 | 5.1/27 | <1 |

* Relative viscosity was measured under the same condition as in Table 2.

Example 8.

Five runs were made for triazine derivative prepared in Run No. 28 of Example 5 as follows. An autoclave equipped with a stirrer was charged with dry ε-caprolactam (2 kg) together with water (0.3 percent by weight) as a catalyst. The air was displaced from the autoclave with nitrogen and sealed.

The reaction mixture was heated at 260°C for 10 hours to complete polymerization, giving molten polymer.

The triazine derivative was injected into molten polymer, which was then stirred vigorously for 1 hour in nitrogen stream, and then taken out of the autoclave from the bottom thereof. The amount of triazine added for each run is given in Table 5. The polymer obtained was melt spun into 210 denier - 24 filament yarn. The properties and antistatic effect of the yarn are given in Table 5.

TABLE 5

| Run No. | Amount added (wt. %) | Relative Viscosity* | Tenacity (g/d) Elongation (%) | Half-life Period (sec.) |
|---|---|---|---|---|
| 1 | 0 | 2.92 | 6.3/30 | ∞ |
| 2 | 0.5 | 2.90 | 6.3/27 | 15 |
| 3 | 1.0 | 2.85 | 6.9/28 | 9 |
| 4 | 3.0 | 2.81 | 5.9/25 | 2 |
| 5 | 5.0 | 2.72 | 5.6/28 | <1 |

Note:- *Relative viscosity was measured under the same condition as in Table 2.

Example 9.

Three runs were repeated for triazine derivative prepared in Run No. 1 of Example 5.
Each run was made as follows.

Nylon 6 chips (full-dull) having relative viscosity of 2.30 was blended with the triazine derivative, then formed into 40 denier - 8 filament yarn by a conventional melt spinning process. The amount of the triazine derivative added in each run is given in Table 6.

The properties, the antistatic effect and the permanency of the effect of the yarn are shown in Table 6, all proving superior.

TABLE 6

| Run No. | Amount added (st. %) | Relative Viscosity | Tenacity (g/d) Elongation (%) | Half-life Period (sec.)*1 | Half-life Period (sec.)*2 |
|---|---|---|---|---|---|
| 1 | 0 | 2.30 | 5.2/31 | ∞ | ∞ |
| 2 | 0.5 | 2.31 | 5.1/33 | 20 | 20 |
| 3 | 1.0 | 2.30 | 5.1/32 | 8 | 8 |
| 4 | 3.0 | 2.25 | 4.2/30 | 2 | 2 |

Note
*1 Half-life period was measured for the sample yarn washed 5 times.
*2 Half-life period was measured for the sample yarn dyed with an acidic dye (Commersie Sky-SE (C.I. Acid Blue 112); Trade Mark) solution having the concentration of 0.3 percent by weight based on the weight of the yarn at pH 4.0, at 95°C for 90 minutes and then washed with water.

Example 10.

Seven runs were repeated on each of the compounds prepared in Run Nos. 3, 29 and 30 of Example 5. Each run was made as follows:

A 5 lit. autoclave equipped with a stirrer was charged with bis-hydroxyethyl-terephthalate (1.5 kg), metallic sodium as an ester interchange catalyst and the triazine derivative. The amount of the triazine derivative added in each run is given in Table 8. Then the air was displaced from the autoclave with nitrogen, and the mixture was then heated at 270°C – 300°C with vigorous stirring to complete polymerization, eluted ethylene glycol distilled off, while gradually reducing the pressure to 10 to $10^{-1}$ mm Hg.

In each run, the polymer obtained was dried, melt spun at 280°C – 300°C with a conventional melt-spinning apparatus and then drawn at the drawing ratio of 3 to 4 into a 210 denier - 24 filament yarn. The antistatic effect as well as other physical properties of the yarn are given in Table 7.

TABLE 7

| Run No. | Amount added (wt. percent) | Triazine derivative prepared in run No. 29 (in Example 5) | | Triazine derivative prepared in run No. 30 (in Example 5) | | Triazine derivative prepared in run No. 3 (in Example 5) | |
|---|---|---|---|---|---|---|---|
| | | Tenacity (g./denier)/ elongation (percent) | Half-life period (sec.) | Tenacity (g./denier)/ elongation (percent) | Half-life period (sec.) | Tenacity (g./denier)/ elongation (percent) | Half-life period (sec.) |
| 1 | 0 | 5.5/14 | ∞ | 5.5/14 | ∞ | 5.5/14 | ∞ |
| 2 | 0.1 | 5.5/17 | 12 | 5.6/18 | 15 | 5.3/17 | 17 |
| 3 | 0.5 | 5.4/18 | 18 | 5.3/17 | 3 | 5.5/19 | 10 |
| 4 | 1.0 | 5.4/17 | 5 | 5.2/19 | 4 | 5.2/20 | 7 |
| 5 | 3.0 | 5.4/15 | 2 | 5.2/16 | 3 | 5.1/21 | 3 |
| 6 | 5.0 | 5.1/16 | 1 | 4.8/20 | 1 | 5.1/25 | 2 |
| 7 | 10.0 | 5.0/20 | <1 | 4.6/21 | <1 | 5.0/13 | <1 |

In order to demonstrate the permanency of the antistatic effect, washing tests were performed on the yarn containing the triazine derivative prepared in Run No. 6 of Example 5 as an antistatic agent by measuring the half-life period of the yarn.

The washing test is made as follows.

The yarn is formed in a bundle of 20 layers, washed with an electric washing machine for 10 minutes at 50°C in 3 percent aqueous solution of commercial neutral detergent, such as "Dash" (Trademark:Lion Oil Co.), and then subsequently with water for 20 minutes. The results of the washing test are given in Table 8.

TABLE 8

| Run No. | Time of Washing | Amount of Triazine Derivative Added (wt. %) | | | | | |
|---|---|---|---|---|---|---|---|
| | | 0 | 0.1 | 0.5 | 1.0 | 3.0 | 5.0 |
| | | Half-Life Period (sec.) | | | | | |
| 1 | 5 | ∞ | 12 | 8 | 5 | 2 | <1 |
| 2 | 10 | ∞ | 10 | 8 | 6 | 3 | <1 |
| 3 | 20 | ∞ | 14 | 7 | 4 | 1 | <1 |
| 4 | 50 | ∞ | 13 | 9 | 5 | 2 | <1 |

Example 11.

The triazine derivative prepared in Run No. 3 of Example 15 was blended with polyester chips having intrinsic viscosity of 0.67 at various blending ratios, i.e., 0.5 wt. percent, 1.0 wt. percent and 3.0 wt. percent.

The resulting compositions were melt spun and stretched in the same manner as described in Example 10 into 210 denier - 24 filament polyester yarn. The antistatic effect as well as the physical properties are given in Table 9.

TABLE 9

| Run No. | Amount added (wt. %) | Tenacity (g/denier) Elongation (%) | Half-life Period (sec.) |
|---|---|---|---|
| 1 | 0 | 5.5/14 | ∞ |
| 2 | 0.5 | 5.3/17 | 14 |
| 3 | 1.0 | 5.1/20 | 6 |
| 4 | 3.0 | 5.1/17 | <1 |

Example 12.

Each of triazine derivatives prepared in Run Nos. 31, 32 and 13 of Example 5 was blended with polypropylene pellets having intrinsic viscosity of 1.8 at various blending ratios, i.e., 0.5 wt. percent, 1.0 wt. percent and 2.0 wt. percent.

Each composition obtained was spun by an ordinary melt spinning process, stretched at a drawing ratio of 3 to 4 to produce 70 denier - 17 filament polypropylene yarn.

The antistatic effect and tenacity-elongation values of each yarn are given in Table 10.

TABLE 10

| | | Triazine derivative prepared in run No. 31 (in Example 5) | | Triazine derivative prepared in run No. 32 (in Example 5) | | Triazine derivative prepared in run No. 13 (in Example 5) | |
|---|---|---|---|---|---|---|---|
| Run No. | Amount added (wt. percent) | Tenacity (g./denier)/ elongation percent | Half-life period (sec.) | Tenacity (g./denier)/ elongation percent | Half-life period (sec.) | Tenacity (g./denier)/ elongation percent | Half-life period (sec.) |
| 1 | 0 | 4.6/32 | ∞ | 4.6/32 | ∞ | 4.6/32 | ∞ |
| 2 | 0.5 | 4.4/30 | 11 | 4.5/21 | 10 | 4.4/35 | 14 |
| 3 | 1.0 | 4.0/38 | 8 | 4.4/33 | 7 | 4.5/31 | 9 |
| 4 | 2.0 | 4.0/35 | 3 | 4.2/30 | 4 | 4.1/36 | 3 |

Further the washing test as described in Example 10 was performed on the yarn to demonstrate the permanency of the antistatic effect, the results given in Table 11.

TABLE 11

| Times of Washing | Amount of Triazine Derivative added (wt. %) | | | |
|---|---|---|---|---|
| | 0 | 0.5 | 1.0 | 2.0 |
| | Half-life Period (sec.) | | | |
| 5 | ∞ | 11 | 8 | 3 |
| 20 | ∞ | 12 | 7 | 3 |
| 50 | ∞ | 14 | 8 | 3 |

Example 13.

The triazine derivative prepared in Example 4 was blended with the polyethylene powder (melt index: 2.5) at blending ratios of 0.5 percent by weight and 1.5 percent by weight.

Each composition obtained was subjected to melt-spinning process into 300 denier monofilament. The antistatic effect and the property of it was measured and given in Table 12.

TABLE 12

| Run No. | Amount added (wt. %) | Tenacity (g/denier)/ Elongation (%) | Half-Life Period (sec.) |
|---|---|---|---|
| 1 | 0 | 5.4/29 | ∞ |
| 2 | 0.5 | 5.0/23 | 8 |
| 3 | 1.5 | 4.9/25 | 2 |

Example 14.

The triazine derivative prepared in Run No. 33 of Example 5 was blended with the polyvinylidene chloride ($\nu_{sol}/c$: 1.02) at various blending ratios, i.e., 0.5 percent by weight, 1.0 percent by weight and 2.0 percent by weight. Each composition obtained was subjected to melt-spinning and then stretched into 600 denier - 15 filament yarn.

The antistatic effect and the property of the yarn was measured and given in Table 13.

TABLE 13

| Run No. | Amount added (wt. %) | Tenacity (g/denier)/ Elongation (%) | Half-Life Period (sec.) |
|---|---|---|---|
| 1 | 0 | 2.3/27 | 8 |
| 2 | 0.5 | 2.0/23 | 9 |
| 3 | 1.0 | 2.1/30 | 3 |
| 4 | 2.0 | 1.8/28 | <1 |

Example 15.

The triazine derivative prepared in Run No. 33 of Example 5 was added to polystyrene pellets in 1 percent by weight based on the polystyrene. The composition obtained was molded into a plate having thickness of 3mm. by means of a conventional extrusion molder. The half-life period of the plate was measured to be 3 seconds at 20°C in relative 40 percent RH and the antistatic effect lasted after washing while half-life period of the plate not containing the triazine derivative is more than 1 minute.

Example 16.

The triazine derivative obtained in Run No. 33 of Example 5 was dissolved in methylmethacrylate monomer at 2 percent by weight based on the monomer to which was added benzoyl peroxide at 0.5 percent by weight. The mixture solution was heated at 60°C for 7 hours and then at 120°C for 1.5 hours to compete cast polymerization.

The obtained polymer was extruded to form a plate having 3mm thickness. The half-life period of the plate was measured to be 3 sec.

What is claimed is:

1. A composition of improved antistaticity consisting essentially of at least one synthetic resin or fiber forming polymer material subject to the build-up of high electrostatic charges thereon and 0.1–20 percent based on the weight of said polymer material of at least one triazine represented by any one of the structural formulas

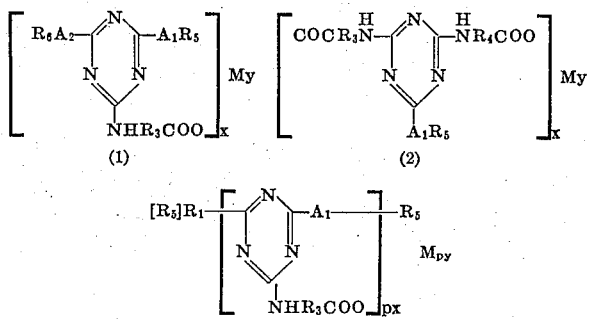

wherein, $A_1$ and $A_2$ are same or different and each denotes a polyalkylene oxide selected from the group consisting of polyethylene oxide of the formula $-(OCH_2CH_2)_n$, polypropylene oxide of the formula

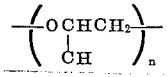

and polyethylene oxide-propylene oxide copolymer of the formula

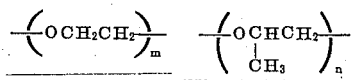

wherein $n$ is an integer of 1 to 200, $m + n$ is an integer of 2 to 200, and $m$ and $n$ are each equal to at least 1, $R_1$ is a one to four carbon atom alkoxy, $R_3$ and $R_4$ are same or different and each denotes a member selected from the group consisting of alkylene of one to 12 carbon atoms, o- and p-cyclohexylene, o- and p-cyclohexylene, o- and p-methylene phenylene; M denotes a member selected from the group consisting of calcium, barium, magnesium, tin, aluminum, copper, potassium, sodium, zinc, manganese, nickel, strontium, and cadmium, and an organic amine selected from the group consisting of mono-, di and tri-ethanol amines, primary, secondary and tertiary amines of one to 17 carbon atoms in each substituent; $x$ and $y$ each denotes an integer of 1 to 4 depending on the valency of the metal; p is an integer of 2 to 5; and $R_5$ and $R_6$ are same or different and each denotes a member selected from the group consisting of hydroxy, alkoxy of one to 10 carbon atoms, naphthoxy, benzoxy, secondary amino of one to 17 carbon atoms and

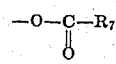

wherein $R_7$ denotes a member selected from the group consisting of hydrogen, alkyl of one to 17 carbon atoms, phenyl and naphthyl.

2. A composition of improved antistaticity according to claim 1 wherein said triazine is represented by said structural formula (1) wherein, $A_1$ and $A_2$ are each polyethylene oxide of $n=30 - 100$, $R_5$ and $R_6$ are each hydroxy, $R_3$ is pentamethylene, and M is a member selected from the group consisting of hydrogen, Ca, Ba, Cu, Mn, mono-ethanolamine, di-ethanolamine and tri-ethanolamine.

3. A composition of improved antistaticity according to claim 1 wherein said triazine is represented by said structural formula (2) wherein $A_1$ is polyethylene oxide of $n=30 - 100$. $R_5$ is hydroxy, $R_3$ and $R_4$ are each pentamethylene, and M is a member selected from the group consisting of hydrogen, Ca, Ba, Cu, Mn, mono-ethanolamine, di-ethanolamine and tri-ethanolamine.

4. A composition of improved antistaticity as claimed in claim 1 wherein said triazine derivative is represented by said structural formula (3) wherein $A_1$ is polyethylene oxide of $n=30 - 100$, $R_5$ and $R_6$ are each hydroxy, $R_3$ is pentamethylene, and M is a member selected from the group consisting of hydrogen, Ca, Ba, Cu, Mn, monoethanolamine, di-ethanolamine and triethanolamine.

5. A composition of improved antistaticity according to claim 1 wherein said polymer material is polycaprolactam.

6. A composition of improved antistaticity according to claim 1 wherein said polymer material is poly-hexamethylene-adipamide.

7. A composition of improved antistaticity according to claim 1 wherein said polymer material is polyethylene-terephthalate.

* * * * *